United States Patent
Garvey et al.

(10) Patent No.: US 9,528,826 B2
(45) Date of Patent: Dec. 27, 2016

(54) HIGH SPEED METROLOGY WITH NUMERICALLY CONTROLLED MACHINES

(71) Applicant: GRALE TECHNOLOGIES, Youngstown, OH (US)

(72) Inventors: Michael Garvey, Canfield, OH (US); James D. Osterloh, West Richland, WA (US); Fred Persi, Akuqyuooa, PA (US)

(73) Assignee: GRALE TECHNOLOGIES, Youngstown, OH (US)

( * ) Notice: Subject to any disclaimer, the term of this patent is extended or adjusted under 35 U.S.C. 154(b) by 0 days.

(21) Appl. No.: 14/932,036

(22) Filed: Nov. 4, 2015

(65) Prior Publication Data

US 2016/0069677 A1    Mar. 10, 2016

Related U.S. Application Data

(62) Division of application No. 13/708,972, filed on Dec. 8, 2012, now Pat. No. 9,222,769.

(51) Int. Cl.
*G01B 5/00*    (2006.01)
*G01B 21/16*    (2006.01)
(Continued)

(52) U.S. Cl.
CPC ............... *G01B 21/16* (2013.01); *G01B 21/04* (2013.01); *G05B 19/401* (2013.01); *G05B 2219/37198* (2013.01)

(58) Field of Classification Search
CPC ....... G01B 5/008; G01B 5/012; G01B 21/047; G01B 11/007; G01B 21/04; G01B 2210/58; G01B 21/042; G01B 11/005; G01B 11/022; G01B 5/004; G01B 21/045; G01B 5/0002
(Continued)

(56) References Cited

U.S. PATENT DOCUMENTS 2,820,187 A    1/1958    Parsons et al.
4,571,149 A    2/1986    Soroka et al.
(Continued)

OTHER PUBLICATIONS

Ilpakurty Ravi, et al. "Converting Resolver Interface to Incremental Encoder Interface", Int'l J. Elec. Eng Res., 2009, pp. 345-348, vol. 1, No. 4, Research India Pub,. India.
(Continued)

*Primary Examiner* — Yaritza Guadalupe-McCall
(74) *Attorney, Agent, or Firm* — Amin, Turocy & Watson LLP; Gregory Turocy

(57) ABSTRACT

Systems, apparatuses and methods are described for integrating an electronic metrology sensor with precision production equipment such as computer numerically controlled (CNC) machines. For example, a laser distance measuring sensor is used. Measurements are taken at a relatively high sample rate and converted into a format compatible with other data generated or accepted by the CNC machine. Measurements from the sensor are synchronized with the position of the arm of the machine such as through the use of offsets. Processing yields a detailed and highly accurate three-dimensional map of a workpiece in the machine. Applicable metrology instruments include other near continuously reading non-destructive characterization instruments such as contact and non-contact dimensional, eddy current, ultra-sound, and X-Ray Fluorescence (XRF) sensors.

20 Claims, 10 Drawing Sheets

(51) Int. Cl.
  *G01B 21/04* (2006.01)
  *G05B 19/401* (2006.01)
(58) Field of Classification Search
  USPC .......................................................... 33/503
  See application file for complete search history.

(56) References Cited

U.S. PATENT DOCUMENTS

| | | | |
|---|---|---|---|
| 5,229,698 A | 7/1993 | Minnich et al. | |
| 5,724,264 A | 3/1998 | Rosenberg et al. | |
| 5,880,849 A | 3/1999 | Van De Ven | |
| 7,065,856 B1 | 6/2006 | Lemelson | |
| 7,343,660 B1 | 3/2008 | Lemelson | |
| 7,743,524 B2 | 6/2010 | Eaton et al. | |
| 9,222,769 B2* | 12/2015 | Garvey | G01B 21/04 |
| 9,360,290 B2* | 6/2016 | Tait | B25J 9/1692 |
| 2003/0033041 A1 | 2/2003 | Richey | |
| 2003/0206285 A1 | 11/2003 | Lau | |
| 2004/0172215 A1 | 9/2004 | Russell | |
| 2005/0166413 A1 | 8/2005 | Crampton | |
| 2006/0088201 A1 | 4/2006 | Delaney | |
| 2008/0235970 A1 | 10/2008 | Crampton | |
| 2009/0030637 A1 | 1/2009 | Kawai et al. | |
| 2010/0153058 A1 | 6/2010 | Crothers et al. | |
| 2010/0207567 A1 | 8/2010 | Mori et al. | |
| 2011/0107611 A1 | 5/2011 | Desforges et al. | |
| 2011/0119025 A1 | 5/2011 | Fetter et al. | |
| 2011/0295550 A1 | 12/2011 | Bonadeo et al. | |
| 2011/0316977 A1 | 12/2011 | Pienaar | |
| 2012/0144685 A1 | 6/2012 | Atwell et al. | |
| 2013/0019488 A1 | 1/2013 | McMurtry et al. | |
| 2013/0111774 A1 | 5/2013 | McMurtry et al. | |
| 2014/0101953 A1 | 4/2014 | Briggs et al. | |
| 2014/0157610 A1 | 6/2014 | Garvey et al. | |
| 2014/0260627 A1 | 9/2014 | Ferrari et al. | |
| 2015/0075018 A1 | 3/2015 | Bridges et al. | |
| 2016/0097629 A1* | 4/2016 | York | G01B 21/04 33/503 |
| 2016/0102965 A1* | 4/2016 | York | G01B 11/005 250/231.1 |

OTHER PUBLICATIONS

LC15Dx_EN_0312, brochure, Nikon, 2011, pp. 3-7, Nikon Metrology NV, USA. (www.nikonmetrology.com).
Non-Final Office Action for U.S. Appl. No. 13/708,972 dated Apr. 1, 2015, 26 pages.
International Search Report and Written Opinion mailed on Jun. 5, 2014 for International Application No. PCT/US2013/073492.

* cited by examiner

| Time Line (milli-sec) 401 | Base-ten Measured Value (mm) 402 | 21-bit value (2's compliment binary) 403 | Calculated Delta (Base Ten) 404 | Quadrature Encoder Value 405 | Coordinate Machine Register Metrology Value (Base Ten) 406 |
|---|---|---|---|---|---|
| 0.000000 | +13.497 | 0 0000 0011 0100 1011 1001 | 0 | 0101 | 13.497 |
| | Measurement Hold Period, Encoder is waiting for next strobe clock at 0.020 millisecond intervals (50.0000 Hz measurement rate) | | | 0101 | 13.497 |
| 0.020000 | +13.499 | 0 0000 0011 0100 1011 1011 | 2 | 0101 | 13.497 |
| 0.020833 | | | | 0110 | 13.498 |
| | Note: Reference Example's Incremental quadrature encoder period is 0.00083333 milli-seconds (1.2 MHz) | | | 1010 | 13.499 |
| 0.040000 | +13.502 | 0 0000 0011 0100 1011 1110 | 3 | 1010 | 13.499 |
| 0.040833 | | | | 1001 | 13.500 |
| 0.041667 | | | | 0101 | 13.501 |
| | Note: Reference Example Coordinate Machine data recording period is once every 0.488281 milli-seconds (2,048 Hz) | | | 0110 | 13.502 |
| 0.060000 | +13.515 | 0 0000 0011 0100 1100 1011 | 13 | 0110 | 13.502 |
| 0.060833 | | | | 1010 | 13.503 |
| 0.061667 | | | | 1001 | 13.504 |
| 0.062500 | | | | 0101 | 13.505 |
| 0.063333 | | | | 0110 | 13.506 |
| 0.064167 | | | | 1010 | 13.507 |
| 0.065000 | | | | 1001 | 13.508 |
| 0.065833 | | | | 0101 | 13.509 |
| 0.066667 | | | | 0110 | 13.510 |
| 0.067500 | | | | 1010 | 13.511 |
| 0.068333 | | | | 1001 | 13.512 |
| 0.069167 | | | | 0101 | 13.513 |
| 0.070000 | | | | 0110 | 13.514 |
| - | | | | 1010 | 13.515 |
| - | | | | 1010 | 13.515 |
| 0.080000 | +13.511 | 0 0000 0011 0100 1100 0111 | -4 | 0101 | 13.514 |
| 0.080833 | | | | 0101 | 13.513 |
| 0.081666 | | | | 1001 | 13.512 |
| 0.082499 | | | | 1010 | 13.511 |
| - | | | | 1010 | 13.511 |
| - | | | | 1010 | 13.511 |

FIG. 4

HIGH SPEED METROLOGY WITH NUMERICALLY CONTROLLED MACHINES

STATEMENT REGARDING FEDERALLY SPONSORED RESEARCH

This invention was made with government support under Contract No. W911NF-11-1-0034 effective 19 Jul. 2011 awarded/issued by US ARMY RDECOM ACQ CTR-W911NF of Durham, N.C. and administered by DCMA Ohio River Valley, Wright-Patterson AFB of Dayton, Ohio. The government may have certain rights in the invention.

CROSS-REFERENCE TO RELATED APPLICATIONS

This is a Division of application Ser. No. 13/708,972, filed on Dec. 8, 2012, the entire contents of which are incorporated herein by reference.

BACKGROUND OF THE INVENTION

Field

The present invention relates to synchronizing, logging and post processing metrology instrument readings with the position and orientation of precision production equipment such as: computer numerically controlled (CNC) mills and lathes, grinding machines, lapping machines, robots, additive manufacturing equipment (a partial list of precision production equipment). More particularly, as an example, the invention relates to synchronizing non-contact dimensional metrology instruments with precision production equipment in order to characterize a workpiece's shape and features while it is loaded in the work space of precision production equipment.

Related Art

At the time of writing, a computer numerically controlled (CNC) machine is capable of manufacturing a workpiece or product to within 2 micrometers ($10^{-4}$ inches) of design specifications under close to ideal conditions. Some precision production equipment can achieve even tighter dimensional tolerances. However, it is difficult to produce CNC machine tools that are capable of high fidelity measurements of said workpiece with absolute accuracy on the order of micrometers ($10^{-4}$ inches). Further, machining and measurement are typically done in separate operations with specialized equipment dedicated to each operation.

Modern CNC machines typically use a drawing or digital model from which is created a profile for the product and/or instructions. The instructions or profile are used to control the operation of the CNC machine. A programmer or operator may be involved to design a manufacturing process from the drawing or model. A numerically controlling program is created manually or automatically through an automated programming device. An operator enters or selects an appropriate numerically controlling program and manually sets a starting material for the workpiece in the CNC machine. Alternatively, the starting material is automatically placed therein.

Subsequently, the CNC machine creates a product by following the set of instructions. The CNC machine cuts, grinds, drills and shapes a workpiece from the starting material. Before processing or manufacturing begins, setup requires many steps including establishing a workpiece coordinate system prior to machining and establishing the maximum material condition such that the first machining pass for each feature removes minimal material (and ensures each tool does not crash into the workpiece). Such setup can be tedious and time-consuming for large geometrically complex parts such as castings and weldments.

Further, just after the product or workpiece is created, it is unknown whether the particular workpiece matches in all respects the drawing or digital model. Conventionally, one way to determine the dimensions, shape and size of a finished workpiece is to use a touch probe and have a coordinate measuring machine (CMM) or CNC machine utilize the touch probe to contact and pause (stop all machine motions) at discrete points of each workpiece feature of interest.

The common touch probe technology measurement method routinely involves four distinct phases for each discrete point. During the first phase the probe is maneuvered along a safe path to a point in space that is along a normal vector from the surface feature of interest. The second phase involves maneuvering the probe along the normal vector until contact with the feature is detected by the probe (mechanism of contact detection internal to the probe body can be a set of contacts, strain gage(s), or optically). After contact is detected, machine motion stops; this pause at a single position enables the precise capture of all spatial variables of the machine and probe. Then an offset is applied to these spatial variables to compensate for the probe tip diameter and the approach vector, thereby computing a discrete point in space corresponding to the feature of interest. The coordinates of this point are stored in memory. The fourth phase generally involves a retreat along the original normal vector to a safe point to start the first phase of the next probe point measurement.

Such procedure is fraught with drawbacks. For example, taking such measurements over the surface of most shapes and workpieces is time-consuming. Further, the stylus ball at the end of the touch probe inherently limits the minimum feature size tactile feedback is capable of, certainly compared to other means of measurement (e.g., laser sensors, optical sensors). Only a limited number of measurements are realistically possible with discrete tactile measurements as determined by the time budget for inspection and the average time between touch probe operations. When the common practice of part verification is conducted in a dedicated instrument, such as a CMM, separate from the production equipment, such as a CNC milling center, the part coordinate system must be established in each operation. The variability involved with establishing the part coordinate system multiple times in multiple machines creates a source of error if and when the same component requires rework in the production equipment. When rework is required, the accuracy requirements of the subsequent set up in the production equipment are increased significantly and may require even more care and time to achieve the part coordinate system and maximum material condition.

Some scientists and engineers have attempted continuous tactile and non-tactile means of performing measurements of workpieces in production equipment. As mentioned previously, the common state of the art for measurement in production equipment involves gathering discrete points, each point requiring on the order of one second, in many instances as much as two seconds per point.

Near continuous measurement tools with rates of thousands of points per second that do not require the production equipment to physically stall at each point has long been desired by industry. However, synchronizing such measurements with the positions and motions of precision production equipment such as a CNC machine has been problematic. Most metrology instruments process their input signal and thus impose a slight temporal delay in reporting their measurements. The metrology instrument temporal delay may be on the order of 400 micro-seconds. This instrument time delay is not an issue when the instrument is utilized to take discrete points with the method outlined above. However, the delay is an issue while attempting to characterize a workpiece with a continuous scan that does not pause in space momentarily to log its readings.

FIG. 1 shows a two-dimensional schematic of a CNC machine according to a conventional use. With reference to FIG. 1, a milling machine 100 includes a headstock 102 from which the milling machine 100 controls a spindle 106 and operating arm 108. Attached to the operating arm 108 is a tool head 110 and touch probe 112. The operating arm 108 brings into contact with a workpiece 116 the end 114 of the touch probe 112. The milling machine 100 knows the location of the end 114 of the touch probe and records a set of positional values when the touch probe 112 detects a mechanical resistance. The workpiece 116 is clamped or otherwise fixed on a movable bed 118. The positions of the various parts of the milling machine 100 (e.g., operating arm 108, bed 118) are monitored and recorded. The bed 118 rests on a rigid frame 120, and the column 122 houses various mechanical, electric and computer-based components. The milling machine 100 may be, for example, a five-axis CNC machine where the axes include: an x-axis, a y-axis, a z-axis through which the operating arm 108 and tool head 110 may be operated; and two axes of rotation (e.g., a-axis, and b-axis) along which the workpiece 116 may be rotated or moved. Commonly the touch probe 112 is removed during cutting operations and installed directly into the spindle 106 during measurement operations without requiring the operating arm 108.

As known in the art, and as can be inferred from FIG. 1, measurements related to the position of the end 114 of the touch probe 112 are taken while the production equipment is paused and the contact probe is engaged with the workpiece. For complex shapes, it is excessively time-consuming to get a sufficiently accurate set of measurements from which to build a model of the particular workpiece 116 in the milling machine 100. While this practice is adequate for establishing workpiece coordinate systems, it is deficient in characterizing the maximum material condition of complex weldments and castings, or verification of workpiece features. Due to the sparse characterization of maximum material condition the operating instructions start out in free space and approach the workpiece in a seemingly timid or cautious manner so as to avoid a crash into the workpiece 116. Once the machining process is complete, the tactile probe may be used to gather a few points associated with each key feature before removing this workpiece 116 and loading the next. Thus, conventional uses include spot-checking a few key sizes or locations of a workpiece 116 before a new blank or starting block is placed in the milling machine 100. Some engineers and operators have attempted to create a continuous or near continuous (hundreds or thousands of points per second) production machine-based measurement system by replacing the touch probe 112 with electronic sensors (not shown). However, there remain substantial shortcomings of repeatedly moving the operating arm 108 to a new location and taking a single measurement with the sensor (not shown), and making a single recording of the position of the sensor related to the workpiece 116 and then synchronizing these two measurements such that in the physical domain they are mechanically aligned to at least the production equipment manufacturer's stated position accuracy and repeatability. These and other disadvantages are overcome with the teachings described in the present invention.

SUMMARY

Embodiments and techniques described herein include improved systems, apparatuses and methods for performing automated setup and verification of milling and other types of precision production equipment such as computer numerical control (CNC) machines. Generally, measurements from a metrology device are converted to a CNC machine tool readable format (e.g., incremental quadrature encoder, sinusoidal encoder, absolute encoder formats). These values are logged by the machine tool synchronously with all machine tool axes. Then, these values are written to a file, post-processed and compared to a CAD model. Corrections may be made such as by providing a spatial shift of the recorded metrology data to compensate for the metrology instrument's inherent temporal delay, or application of machine tool offsets between the production equipment's datum and location of the metrology instrument during the scan. Data may be stored for each serialized workpiece and may be used for production cycle and life cycle comparisons.

In a particular exemplary implementation, a laser distance measuring device outputs raw measurements, and these measurements are rapidly converted (imposing another temporal delay) into one of several formats that are consistent or compatible with a data format of a CNC machine. Laser-based distance measurements and CNC machine location and orientation measurements are recorded synchronously. As the laser measuring device is swept across the surface of the workpiece, the result is a substantially complete set of measurement data for a workpiece. The metrology measurements have a spatial offset vector directly proportional to the metrology instrument's temporal delay (plus the signal converter's temporal delay) and the scan speed and direction of the CNC machine at the precise moment of the synchronized recording. This spatial delay is calculated and corrected for during the post processing of the recoded metrology data. An actual representation of a workpiece can be constructed and compared against a model, profile or design for the particular workpiece. This technique may be trivially extended to any type of high-speed measurement sensor that outputs scalar values.

Extra post-processing is required when the metrology instrument outputs non-scalar data such as the two- or three-dimensional data from an ultrasound instrument or the multi-parameter data from an XRF alloy analyzer. A modulated scalar indexing signal is used to synchronize these more complex metrology instruments with the motions of precision production equipment. The separate scalar signal is created and simultaneously recorded by the production equipment and a separate data logger. The separate data logger records the modulated scalar values and the multi-dimensional metrology data. Upon post processing the temporal delay is accounted for as discussed above for one-dimensional scalar instruments. Then the database of indexed, multi-dimensional metrology data is assembled with the production machine's shifted spatial data using the recorded index values to precisely locate each multi-dimensional metrology reading.

It should be emphasized that—in the preferred embodiment of the invention—the production machine's spatial data is shifted (interpolated) rather than the metrology data. Since the production machine has inertia it can only move from point to point in an incrementally smooth fashion. This smooth motion and therefore smooth spatial data (no discontinuities) provides the basis for sound interpolation between points. If on the other hand metrology data are interpolated to fit exactly with the production machine's spatial data, one would be required to interpolate between a set of data points that may have sharp discontinuities and thus do not satisfy the basic assumptions required for interpolation. Such discontinuities in dimensional data occur at feature edges such as pockets, holes, workpiece corners, etc. Discontinuities in ultra-sound data are associated with inclusions, voids, and feature interfaces on the opposite face of workpiece. Discontinuities in eddy current data occur at surface cracks and other surface and near surface changes in local electrical impedance. Discontinuities in XRF data may occur at weld boundaries, areas of alloy depletion/augmentation associated with heat treatment, welding, or in-service corrosion such as inter-granular attack.

One result is to enable or speed up automated setup, which may include establishing a workpiece coordinate system and its detailed maximum material condition prior to initializing the production operation. Another result is a highly accurate verification of a workpiece after or between the production steps. The measurements are provided to the machine prior to breaking setup. Such measurements enable the closed-loop control of the precision production equipment without breaking setup and re-establishing the part coordinate system. Such in-situ verification enables substantially complete serialized dimensional quality control of each workpiece. Production tolerances are ensured and continuously improved. Workpieces are produced and verified to match design assembly dimensions within tight tolerances. Multiple component matching may be performed based on serialized quality control data yielding assemblies with tighter stack-up tolerances. Machine drift may be characterized and corrected throughout daily, weekly and monthly production cycles. Still another result is to enable the three dimensional surface, sub-surface and through-body characterization of a workpiece utilizing the production equipment to articulate the associated instruments over the surface of the workpiece. The derived set of spatially oriented metrology data can be used to qualify a workpiece for further production work, or ultimately either qualify or reject it for field service. When a serialized part returns from field service and is considered for repair and re-use the original serialized metrology data set can be compared against a similarly derived post-service data set to accurately measure a workpiece's wear, corrosion, distortion, change in alloy composition, growth of surface and subsurface faults such as cracks, voids and inclusions.

During operation of a CNC machine, automated adjustments may be made, and closed-loop dimensional control is enabled. Consequently, feedback is provided to the CNC machine based on the shape of the actual machined workpiece without breaking set up and requiring the re-establishment of workpiece coordinate system. Previous techniques have been limited to providing feedback based solely on a small number of measurements related to machine tool location and offsets.

This Summary is provided to introduce a selection of concepts in a simplified form that are further described below in the Detailed Description. This Summary is not intended to identify key or essential features of the claimed subject matter, and thus is not intended to be used to limit the scope of the claimed subject matter.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

FIG. 4 shows a table illustrating an exemplary computation scheme and exemplary set of values from a distance sensor according to one implementation of the invention.

DETAILED DESCRIPTION

Overview.

Precision production equipment and measure machines have been used for many years to make two-dimensional and three-dimensional workpieces from solid blanks or blocks of a starting material. Material is removed little by little until the final workpiece remains. Milling machines come in a variety of sizes. Milling machines can move a spindle, arm or tool relative to the workpiece, or can move the workpiece relative to the spindle, arm or tool. Often, the milling tool is a rotating milling cutter, which cuts on the tool's sides and tip. While some milling machines are manually operated, most modernized milling machines are computer controlled. Such control is often referred to as computer numerically controlled (CNC). While a CNC machine may be referenced herein, such referenced machine is not limited to just milling machines, but refers generally to all precision production equipment.

A workpiece is often created from a model or digital design. An operator, programmer or automated computer program turns the digital design into a series of commands to control the milling machine. The CNC machine precisely controls workpiece and tool movement. Often, precision CNC machines measure their position to within 0.00001 inches (0.25 µm) while monitoring actual tool path versus programmed path.

Once a workpiece is complete, it is helpful to measure the workpiece to see how closely the actual workpiece matches the digital or computer aided design of the workpiece.

Figure 1:
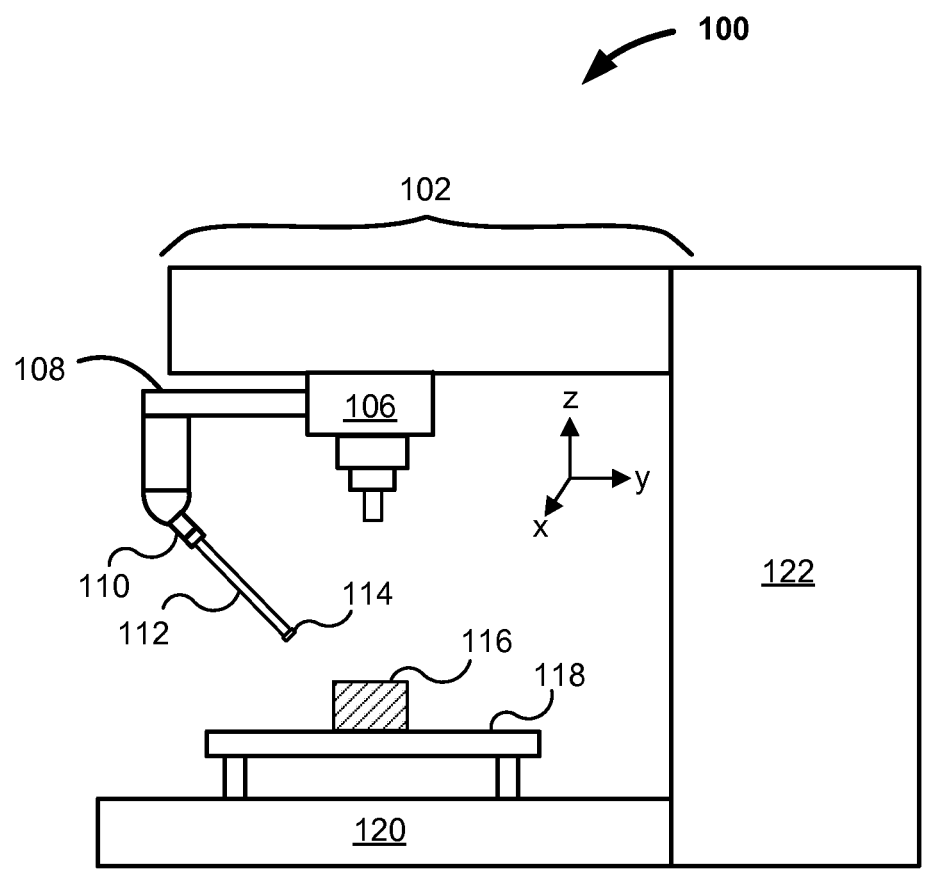
FIG. 1 shows a two-dimensional schematic of a CNC machine according to a conventional use.

Previously, quality control and feedback measurements were taken one at a time by a measurement probe as described in relation to FIG. 1, or even more commonly removed from the production equipment without any inspection prior to breaking setup. Prior to releasing a finished workpiece 116, the milling machine 100 may change tools by selecting a touch probe 112. The touch probe then would be used to touch a discrete location on the workpiece 116. Touching could then be repeated as desired before changing tools. A comparison could be made between an actual measurement from the workpiece 116 and a corresponding prediction from the workpiece design. If the measurement (e.g., distance) is off by an excessive amount, then an adjustment could be made. The workpiece could be further milled or could be rejected if the workpiece measurements are not within tolerances. While some machinists have attempted to replace the touch probe 112 with a high speed measuring device, using the same previous technique (making measurements one at a time) is not adequate because most manufacturing operations cannot afford to take more than a few measurements before another workpiece 116 must be started and created so that a sufficient number of workpieces can be made within a given amount of time.

Detector.

Figure 2:
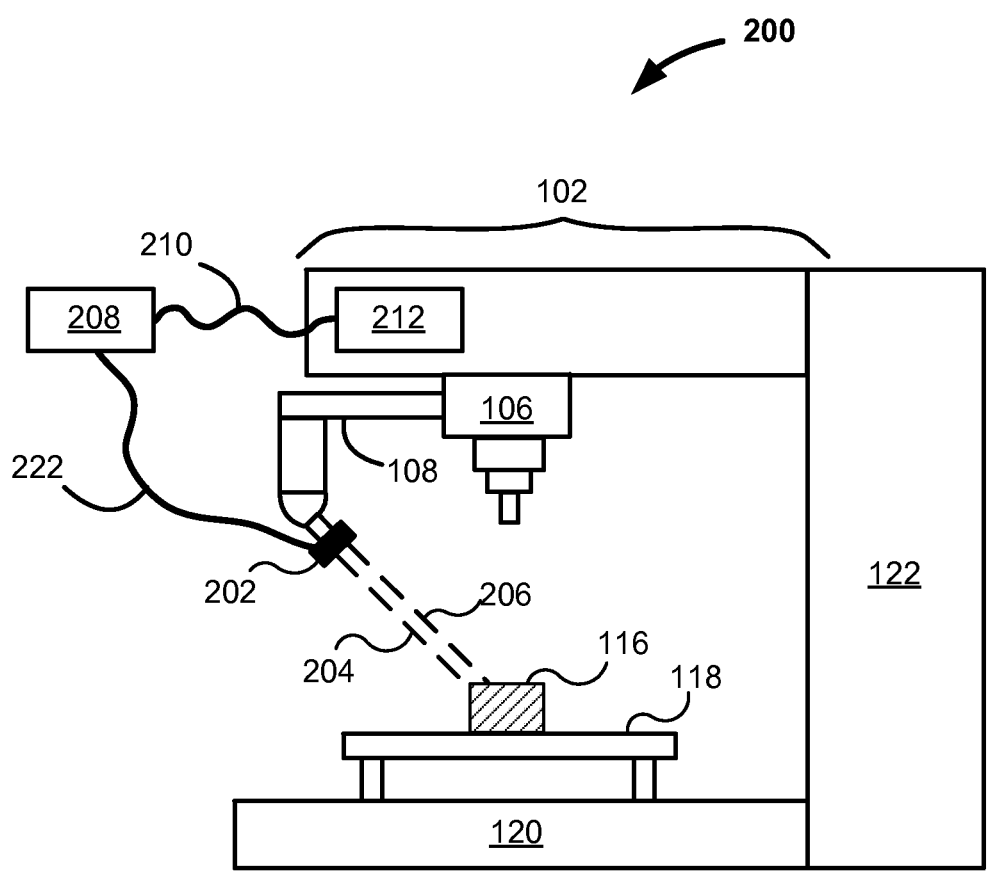
FIG. 2 shows a two-dimensional schematic of a CNC machine according to one implementation of the invention.

The current invention employs a different technique to capture measurements of a workpiece 116. FIG. 2 shows a two-dimensional schematic of a CNC machine 200 according to one implementation of the invention. With reference to FIG. 2, a CNC machine 200 includes a headstock 102 from which the CNC machine 200 controls a spindle 106 and/or operating arm 108. Reference in this description is made to an operating arm 108, but may equally apply to the spindle 106 or a tool or measurement device attached to the spindle 106. Attached to the operating arm 108 is an electronic measurement device 202. The electronic measurement device 202 emits a signal 204 (e.g., laser, ultrasound signal) and measures a return signal 206. The position of the electronic measurement device 202 is adjusted and coordinated with a known position and/or orientation of the operating arm 108. Accordingly, the CNC machine 200 can track the location or position of the operating arm 108 and therefore the location or position of the electronic measurement device 202 as the operating arm 108 moves about the workpiece 116. In one implementation, the CNC machine 200 records by a computer component 212 values associated with the operating arm 108. However, the CNC machine 200 does not directly synchronize or wait for a single measurement from the electronic measurement device 202 at each of a set of discrete locations about the workpiece 116. Instead, the electronic measurement device 202 records, sends, or records and sends measurements to a converter or encoder 208 as the operating arm 108 moves about the workpiece 116. The electronic device 202 may be connected by a cable 222 to the encoder 208, or may wirelessly communicate with the encoder 208. Alternatively, the encoder 208 may be incorporated into the electronic measurement device 202, the computer component 212, or a combination of the encoder 208 and the computer component 212. While the CNC machine 200 operates, the encoder 208 sends data (e.g., values, numbers, distances, positions, measurements, modulated index signal) derived from the electronic measurement device 202 via a cable 210 or wireless transmission to the same or other computer component 212 of the CNC machine 200.

The encoder 208 accepts measurements from the electronic measurement device 202 one at a time. In alternative embodiments, the encoder 208 accepts measurements in batches from the electronic measurement device 202. The measurements may be raw or converted by the electronic measuring device 202. With reference to FIG. 2, the sensor or electronic measurement device 202 generates values, preferably at a substantial rate (e.g., on the order of hundreds, thousands or more times per second). These sensor readings may be in any format, but are generally in a binary format, depending on the particular measuring device. As explained in further detail herein, the encoder 208 receives or detects the sensor readings or measurements. In a preferred implementation, the encoder 208 turns the measurement values into incremental values followed by a burst of incremental quadrature values, or other format that is consistent or compatible with the data format of the precision production equipment being used (such as a CNC machine) and consistent with positional values of the operating arm 108 or spindle 106 of any particular CNC machine 200.

The encoder 208 converts the measurement values one at a time. The CNC machine 200 is programmed to log coordinates of the operating arm 108 along with the synchronous value of the data register used to integrate the bursts of incremental encoder values from the encoder 208.

In summary, in the exemplary implementation shown in FIG. 2, a high-speed measurement device generates a signal that is processed into a format that is natively readable by a computer component 212 of the CNC machine 200. The CNC machine 200 generates and tracks coordinates, and with the assistance of the electronic measurement device 202 and encoder 208, is able to record a substantial series of metrology measurements. With the metrology measurements, a computer program associated with the CNC machine 200 can generate a three-dimensional representation of the actual workpiece 116. The CNC machine 200 can be any precision production equipment such as a CNC machine, milling machine, measurement machine and the like.

In the description, a laser distance measurement device has been described as an exemplary metrology instrument. Other metrology instruments may be synchronized in the same manner in order to map a workpiece's associated surface, near-surface and through-body characteristics to its three dimensional model while said workpiece is in the work space of precision production equipment. Examples of other metrology instruments include contact dimensional instruments (LVDT, etc.), surface flaw detectors such as eddy current, through-body inspection such as ultrasound, and alloy analyzers such as x-ray fluorescence (XRF) analyzers.

Example.

The following is a specific example of the components used according to one functional implementation of the invention. With reference to FIG. 2, the CNC machine 200 is a Milltronics vertical machine (Milltronics CNC Machines, Waconia, Minn., USA), and the particular model is a VM-20 machining center. An electronic measurement device 202 is an LK-G5000 series CMOS laser displacement sensor (Keyence, Elmwood Park, N.J., USA).

The electronic measurement device 202 is connected to the encoder 208 through an expansion 40-pin connector via a 40-conductor ribbon cable. The values from the electronic measurement device 202 are read at approximately 50,000 times per second. Other detection speeds are possible. The sequence of values from the electronic measurement device 202 is converted to a sequence of delta values (current measurement minus previous measurement); the sequence of delta values are converted to bursts of quadrature output signals with a pulse rate of approximately 1.2 MHz. The quadrature output signal is one that is compatible with or in a format acceptable to the CNC machine 200. It should be noted that the calculation and use of a sequence of delta values is an optional step used in conjunction with incremental or sinusoidal encoder-based precision production equipment. The calculation of a sequence of delta values is not required for precision production equipment based on absolute encoders. The 1.2 MHz pulse rate was empirically determined and conformed to a rate that was compatible with the speed that the CNC machine (CNC controller) can read, detect or accept without losing or missing any pulses/increments.

An encoder 208 is a TS-7800 series of single board ARM-based microcontroller that includes a customizable field-programmable gate array (FPGA) (Technologic Systems Inc., Fountain Hills, Ariz., USA). The encoder 208 monitors a strobe signal from the distance measurement device 202 to determine when values on pin 20 (designated as the least significant bit) thru pin 40 (most significant bit) of the 40-conductor ribbon cable are valid. The binary number represented on pins 20-40 are captured only when the strobe signal is high (valid). When the strobe signal is low, no value is captured. This preliminary validity check eliminates false data from being processed and recorded while the voltages on the 40-conductor ribbon cable are in transition.

An optional low-pass filter algorithm was applied to the data from the electronic measurement device 202. One benefit of the low-pass filter is limiting a delta of the signal to equal to or less than the number of incremental pulses that can be communicated between the encoder 208 and the CNC machine before the next electronic measurement device strobe signal is created. For this example the low pass filter limits the magnitude of the delta (current measurement minus previous measurement) to about ±20 microns (20 encoder increments in this example implementation) for every output cycle of the electronic measurement device 202. In alternative implementation, another benefit of the low-pass filter is to prevent undesired effects of signal noise. Without the low pass filter a single noise event can affect the metrology accumulator value in the CNC machine for several cycles. If the noise event causes a delta calculation of magnitude greater than can be communicated between the encoder 208 and the CNC in one data cycle (50,000 Hz data rate has a data cycle of 20 microseconds) then the next data reading may be missed while finishing the burst of incremental pulses. Furthermore it will take the same amount of time (measured at approximately 833 nanoseconds per pulse) to restore the CNC's internal metrology register to the nominal value.

The encoder 208 (signal converter) compares each absolute displacement value to the last absolute value by subtracting a previous value from a new value, thereby creating a delta value. This delta value is then sent out as a burst of increments on a four-bit wide bus such as on a shielded multi-wire cable following an industry standard for quadrature incremental encoders. This industry standard accounts for both magnitude and direction (either a positive or negative delta). Thus, the signal converter translates in substantially real time absolute measurement values to incremental quadrature values. The CNC machine 200 receives the incremental quadrature signal from the encoder 208, and the CNC machine 200 increments an associated accumulator register in its memory. On a precisely controlled temporal interval, the CNC machine logs synchronously the associated metrology signal accumulator register along with values associated with machine tool axes (e.g., x-axis, y-axis and z-axis).

At the computer component 212 (of the Milltronics VM-20 machining center), machine tool axes and laser displacement value are logged synchronously at approximately 2,048 times a second. The outputted binary number of the electronic measurement device is an absolute displacement value of the measurement. Because the sensor is attached to the CNC (coordinate) machine 200, the coordinates (i.e., highly accurate location) of the sensor are available to the CNC machine 200. Many CNC machines perform with 5 or more axes, and according to the invention, the encoded values are received and logged by the CNC as if it were another machine axis.

Many CNC machines check or track position, velocity and acceleration at fixed temporal intervals throughout the execution of its programmed tool path. The Milltronics CNC mill checks its position, velocity vector, acceleration vector, axis drive motor amplifier command signals 2,048 times a second. We will call this cycle the kinetic control loop. These values are compared against desired tool path and appropriate corrections are applied. During a machine move along a tool path, this kinetic control loop is the primary function of the precision production machine's controller, frequently using a substantial amount of its computing power. If the metrology logging methodology employed a system of interrupts to acquire machine locations, the precision production machine's primary function during a machine move along a tool path may be disturbed, perhaps to the point of compromising tool path. The invention does not use a system of interrupts or other secondary ways to acquire machine locations, but rather utilizes the machine controller's kinetic control loop.

During the factory testing of new tooling centers the kinetic control loop is augmented with a kinetic control logging routine. The kinetic control logging routine provides factory technicians detailed data showing the machine's physical response to various tool path changes. Factory personnel use this data as a basis for tuning the axis drive motor amplifier gains to obtain optimal machine performance. During the factory tuning of the Milltronics VM-20 all the mentioned position, velocity, acceleration and feedback values are recorded at a rate of 2,048 times per second. The kinetic control data logging is as an element of the kinetic control loop, not a secondary program loop or interrupt routine. This data is temporarily stored on the main processing board until the test move is complete. On-board storage is used to minimize the time required for the controller to perform the storage function such that the machine move along the tool path is not disturbed.

The kinetic control data logging routine was utilized and optimized for this invention. If all the velocity, acceleration, and control signals are logged along with one channel of metrology data, the VM-20 logging routine is limited to approximately 35,000 points (approximately 17 seconds of scan time at 2,048 samples per second). To make additional room for more metrology data, the standard kinetic control logging routine was modified to not record axis velocity, acceleration or the amplified control signals. By limiting the logged data to just the axis positions and the metrology data, a storage volume of approximately 250,000 points (approximately two minutes of scan time at 2,048 samples per second) was enabled on the Milltronics VM-20. This can be further increased by expanding the onboard memory or utilizing a controller that can communicate to an external memory device in real time during a programmed move. The logging time can be further increased by logging every second, third, fourth, etc. cycle through the machine kinetic control cycle (integer multiples of the machine kinetic control loop cycle).

In one implementation, due to limitations of the computer component(s), logging was found to be limited to approximately 250,000 points per one computer file. However, the technique is much more general. One can consider a batch of values such as those in a single file as a "point cloud." Such point cloud can be written to an external computer (not shown in FIG. 2) via file transfer, a socket algorithm or other programming. Once the values are recorded, one or more steps of post-processing are performed. In one such example, a time shift or measurement correction is made to adjust for and accommodate a delay in metrology instrument measurement. In another example, tool offsets or positional corrections are made to compensate for measured feature deviations as compared to a CAD model. Such tool offsets or positional corrections may be done manually or programmatically. When all measurements are corrected back to machine coordinates, a study of precision production equipment accuracy versus location of workpiece inside the working volume may be conducted.

Once the data from the CNC machine 200 and electronic measurement device 202 are collected, unbiased and stored, further post processing can occur. For example, a post-processed point cloud may be compared to a CAD model in a graphical software program. For example, a comparison of data is compared using PolyWorks® software (InnovMetric Software Inc., Québec, Canada) or CAPPS NC software (Applied Automation Technologies Inc., Rochester Hills, Mich., USA). Any workpiece 116 can be compared. For example each of a series of workpieces can be compared with each other and compared against a CAD model (and set of CNC instructions) of the workpiece. Such comparison enables a lifecycle dimensional comparison that can detect wear of tools, distortions, and the like.

Methodology.

Figure 3:
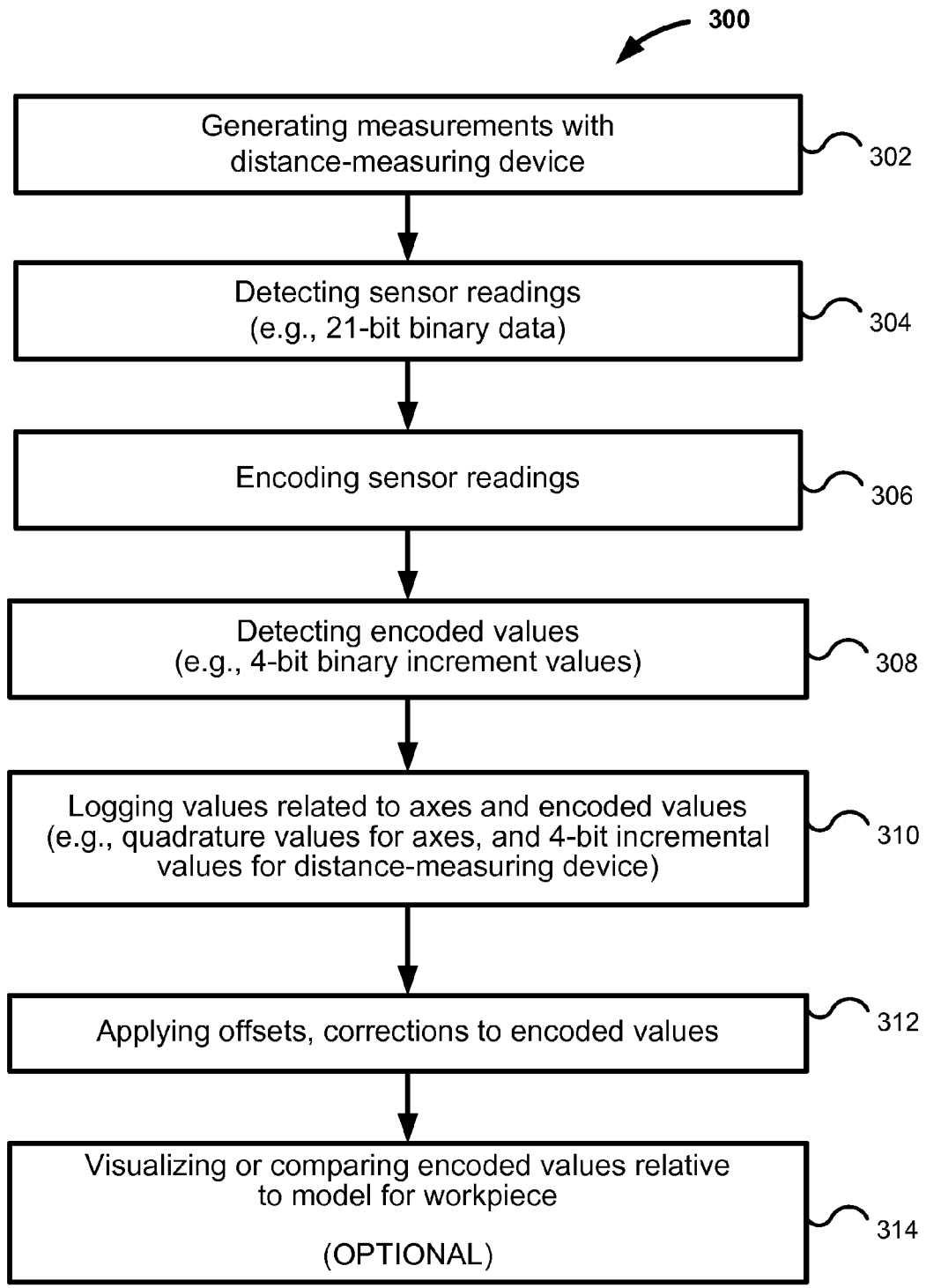
FIG. 3 shows a flowchart of an overview of coordinating distance measurements with a CNC machine according to one implementation of the invention.

FIG. 3 shows a flowchart 300 of an overview of coordinating distance measurements with a CNC machine according to one implementation of the invention. With reference to FIG. 3, the method includes generating measurements with a distance-measuring device or sensor 302. Such generation involves conversion of one energy form into another, and may involve conversion of an analog electronic signal into a digital signal. Next, the method includes detecting sensor readings, or portion thereof, by a converter or encoder 304. Next, the encoder converts or encodes the sensor readings 306. In one implementation, encoding transforms the sensor readings or portion thereof into delta or incremental values consistent or compatible with a format acceptable to a CNC machine. Next, the CNC machine detects or accepts encoded values 308. Next, the CNC machine logs values related to one or more axes and appropriate and/or corrected encoded values 310. Further, offsets or corrections to the encoded values may be applied 312. Optionally, the logged values may be visualized or compared against a model for the workpiece in the CNC machine 314.

According to a preferred implementation, an incremental quadrature encoder is used. An incremental encoder provides pulse output that has an understood magnitude and communicated direction (positive or negative) as dictated by a pulse sequence convention. To provide useful position information, the encoder position must be referenced to the measurement device to which it is attached, generally using an index pulse. One distinguishing feature of an incremental encoder is that it reports an incremental change in position, not an absolute position. The invention is not limited to the use of incremental quadrature encoders. The data format created by the invention's encoder is dictated by the data format of the precision production equipment to be interfaced with. The data format created by the invention's encoder may be incremental quadrature, sinusoidal, absolute position or any other format used by a particular precision production machine's controller.

Quadrature.

Many CNC machines use linear and/or rotary encoders in association with motor shafts of its moving parts to track the position of the operating arm 108 or spindle 106 along its various axes of motion. Motors are controlled and given directions by an associated computer and software. Motors facilitate incremental rotary or "quadrature" encoders by keeping track of binary values associated with two (or more) signals that are out of phase with each other as motor shafts turn. One example of signals is a set of two square waves that are 90-degrees out of phase with each other; these two signals are often labeled A and B. In CNC machines, the "encoders" provide a counting of increments of linear travel or rotation of the motors, and corresponding linear travel along respective axes along which the operating arm 108 or spindle 106 moves. Using the counting or values of the signals, it is possible to determine which direction the operating arm 108 is moving. For example, depending on the direction of rotation, one gets either 00, 01, 11, 10 or 00, 10, 11, 00 which corresponds to either "0, 1, 3, 2" or "0, 2, 3, 1." From a given set of absolute starting positions, quadrature readings enable a CNC machine (and computer) to precisely navigate in a three-dimensional workspace while using electric currents to operate motors that rotate and cause motion along tracks.

The invention combines converted measurements from a metrology device with measurements from the axis encoders of the CNC machine to map features and characteristics of the work piece inside the workspace of the precision production equipment. The CNC machine is given a means to independently characterize a workpiece.

FIG. 4 shows a table 400 that illustrates an exemplary computation or encoding scheme followed by an encoder as described herein. With reference to FIG. 4, a table 400 includes a first column 401 representing a timeline, a second column 402 showing exemplary values of base-10 corresponding to measurements from a distance sensor according to one implementation of the invention. While the first timeline value is 0.000000 milliseconds is an arbitrary value, the number of digits of the timeline 401 is exemplary. The timeline 401 is not used in encoding but shows the temporal relationships between functional elements of the invention. The table 400 also includes a third column 403 of 21-bit binary values corresponding to the values shown in the second column 402. For the Keyence LK-G5000 measuring device, the output is a series of measured values in the form of a binary number (two's complement) of 21 bits. The table 400 includes a fourth column 404 of delta values (current measurement minus previous measurement) calculated internal to the invention's encoder. The table 400 includes a fifth column 405 of encoded quadrature values destined for a CNC machine. The invention's encoder transforms a sequence of measured values shown in column 403 into a sequence of delta values represented by base ten values shown in column 404 and finally into bursts of encoded quadrature values shown in column 405. The precision production equipment receives the encoder's quadrature values and updates its internal register as shown in sixth column 406 of the table 400. The precision production equipment synchronously records all of its axis positions simultaneously along with the internal metrology register.

Encoding according to one exemplary implementation of the invention is now described in reference to values of the five rows 410, 412, 414, 416 and 418. The measurement from the metrology instrument at a point in time, 0.000000 milliseconds, is detected as +13.497 mm as shown in the second column 402. The actual signal detected is binary corresponding to the 21-bit value (0 0000 0011 0100 1011 1001) shown in the third column 403. Assume (for sake of this illustration) the current quadrature state is (0101) as shown in the fifth column 405.

Moving to the second row 412, a measurement from the metrology instrument at a next point in time, 0.020000 milliseconds, is detected as +13.499 mm as shown in the second column 402. The actual signal detected is binary corresponding to the 21-bit value (0 0000 0011 0100 1011 1011) shown in the third column 403. The encoder converts this number to a delta value relative to the previous value: (delta=+13.499−+13.497=+0.002). The encoder then creates a burst of two quadrature pulses in the positive direction (understood increment is 0.001): first pulse as (0110), second pulse as (1010), sequence shown in the fourth column 404. The period between these two pulses is limited by the system being used and was set to 833 nanoseconds for the equipment described (quadrature burst data rate of 1.2 MHz mentioned above). The quadrature state of (1010) is held constant between 0.020833 and 0.040000 milliseconds (between points in time). As the precision production equipment receives each pulse, the direction is understood by convention and the internal register assigned to the metrology instrument is updated as shown in column 406.

Moving to the third row 414, a reading from the metrology instrument at a next point in time, 0.040000 milliseconds (20 micro-seconds after the row 412 reading, corresponding to a data rate of 50,000 Hz mentioned above), is detected as +13.502 mm as shown in the second column 402. The actual signal detected is binary corresponding to the 21-bit value (0 0000 0011 0100 1011 1110) shown in the third column 403. The encoder calculates the new delta: (delta=+13.502−+13.499=+0.003) shown in column 404. The encoder then creates a burst of three quadrature pulses in the positive direction starting from the hold state of (1010): first pulse as (1001), second pulse as (0101), third pulse as (0110): the sequence shown in the fifth column 405. These values are transferred to (detected and processed by) the CNC machine 200 in a data register—column 406—that is incremented by each described pulse.

Moving to the fourth row 416, a reading from the metrology instrument at a next point in time, 0.060000 milliseconds, is detected as +13.515 mm as shown in the second column 402. The actual signal detected is binary corresponding to the 21-bit value (0 0000 0011 0100 1100 1011) shown in the third column 403. The encoder calculates the new delta: (delta=+13.515−+13.502=+0.013) shown in column 404. The encoder then creates a burst of thirteen quadrature pulses in the positive direction, sequence shown in the fifth column 405. These values are transferred to (detected and processed by) the CNC machine 200 in a data register—column 406—that is incremented by each described pulse. The time interval required to communicate the delta of magnitude 0.013 can be seen in column 401 and is 0.0100000 milliseconds (half of the metrology instrument measurement period 0.020000 milliseconds). It should also be mentioned here that the quadrature encoder pulses are created at points in time slightly delayed from those shown as dictated by the time to calculate the delta values. Thus it can be seen that, for this example, a low-pass filter delta magnitude limit should be on the order of 0.020 if it is important to read and to substantially communicate every metrology instrument reading and avoid the detrimental effects of singular events of noise whether inherent to the workpiece, metrology instrument, communication channel or other sources of large discontinuities in received data.

Moving to the fifth row 418, a reading from the metrology device at a next point in time, 0.080000 milliseconds, is detected as +13.511 mm as shown in the second column 402. The actual signal detected is binary corresponding to the 21-bit value (0 0000 0011 0100 1100 0111) shown in the third column 403. The encoder calculates the new delta: (delta=+13.511−+13.515=−0.004) shown in column 404. The encoder then creates a burst of four quadrature pulses in the negative direction, sequence shown in the fifth column 405. These values are transferred to (detected and processed by) the CNC machine 200 in a Coordinate Machine Register—column 406—that is incremented by each described pulse. This final example is used to illustrate a negative delta (decrement).

Figure 5:
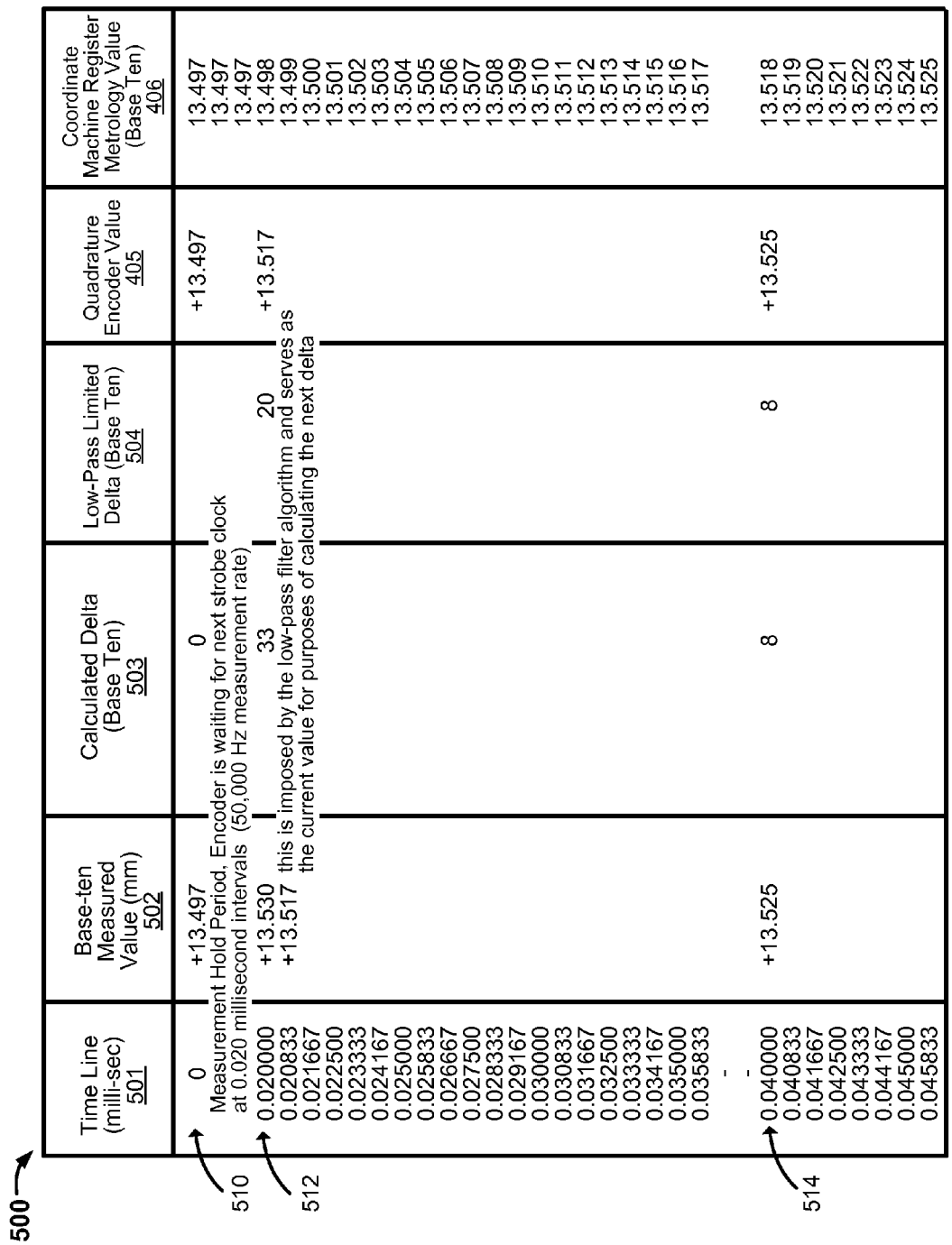
FIG. 5 shows a table of a result of an exemplary calculation and logging of values from a machine and converted values according to one implementation of the invention utilizing an optional low-pass algorithm.

FIG. 5 shows a table 500 illustrating an exemplary computation or filtering scheme that maximizes the systems response rate to a rapidly changing metrology signal while ensuring that each sequential data signal, generated at 50,000 Hz rate in the above, is read and influences the output encoded signal. Occasionally, a high rate of change metrology signal will be encountered. The low-pass limit is imposed if and only if the rate of change, quantified as the calculated delta value in column 503, creates a delta that takes longer to communicate with the incremental encoder than is available between metrology signals (in the above example the metrology signal rate is 50,000 Hz, data intervals are 0.020 milliseconds). The first column 501 depicts the system timeline similar to column 401 shown in FIG. 4. Column 502 shows sequential measured values, at times as modified by the low-pass algorithm. Column 503 shows the calculated Delta similar to column 404 in FIG. 4. Column 504 shows the low-pass limited Delta when the limit is set at 20. Column 505 shows the low-pass imposed current reading when the low-pass limit is set at 20. Column 506 shows the Coordinate Machine Register value assigned to track the metrology measurement value. Row 510 shows a hypothetical starting state. Row 512 shows a hypothetical subsequent state with a measured value 33 increments greater than the previous value. In row 510 the progression of the state machine is shown first calculating the actual delta at 33, then limiting the delta to the low-pass set point (20), then imposing a low-pass current reading only 20 greater than the previous reading, and finally incrementing the output one increment as shown in column 506. The subsequent 19 rows show the progression of the time line and Coordinate Machine Register Metrology Value as it is incremented 19 more times. It should be noted that the internal register assigned to track the previous reading has been set to 20 greater than the previous reading. Row 514 shows a subsequent metrology reading slightly less than the previous true reading but greater than the low-pass imposed previous reading. The low-pass previous reading is used to calculate the delta of 8, the low pass imposed current reading is unchanged from the current measured value, and the output is incremented once. The subsequent 7 rows show the timeline progressing and Coordinate Machine Register Metrology Value as it is incremented 7 more times.

Note that the implementing a low-pass filter algorithm is one method of handling rapidly changing signal values. Other approaches are possible.

Figure 6:
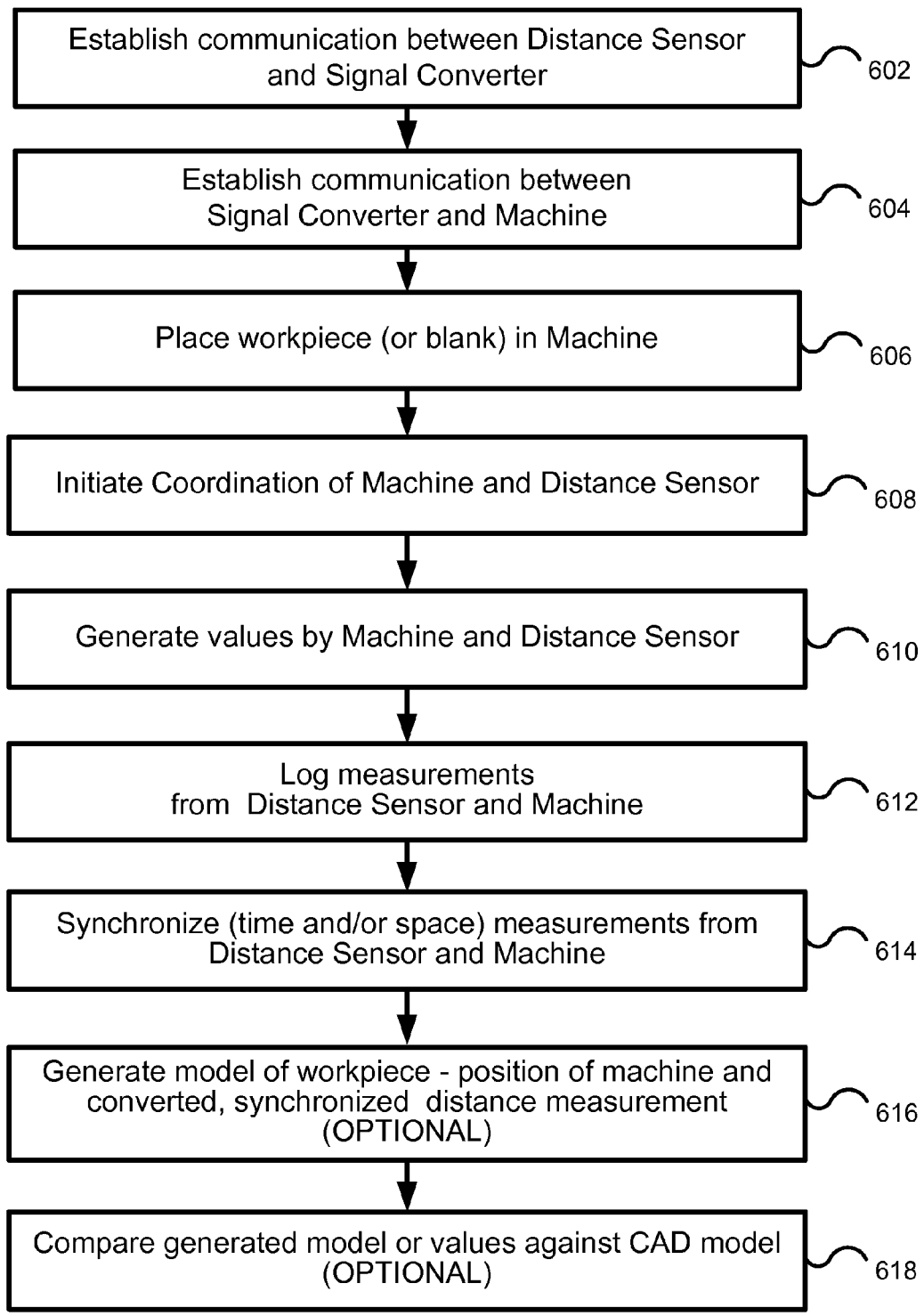
FIG. 6 illustrates steps to implement one embodiment of the invention.

FIG. 6 illustrates steps to implement one embodiment of the invention for characterizing (e.g., shape, surface, near surface, sub-surface characteristics) workpieces using the invention to communicate and synchronize generic metrology data with precision quality control equipment such as Coordinate Measuring Machines (CMMs). With reference to FIG. 6, a first step may include establishing an electronic communication between a metrology instrument and signal converter 602. Another step includes establishing communication between the signal converter and a CMM 604. Another step includes placing a blank or unworked workpiece in the CMM 606. Subsequently, coordination is initiated between the CMM and metrology sensor 608. Values or measurements are generated by the CMM and metrology sensor 610. Measurements are logged or persisted from the metrology sensor and the CMM 612. The measurements are synchronized with respect to one another 614. As one example, the measurements are synchronized in time relative to one another. In an optional step, a model or graphical rendering or plot may be generated from the values or measurements 616. The values include a series of metrology values generated from the metrology instrument and a series of position values from the coordinate machine. Optionally, the graphical rendering or values may be compared against a computer-aided drawing (CAD) model or other model from which the workpiece was generated a coordinate machine 618. Variations on this series of steps are possible.

Example.

Figure 7:
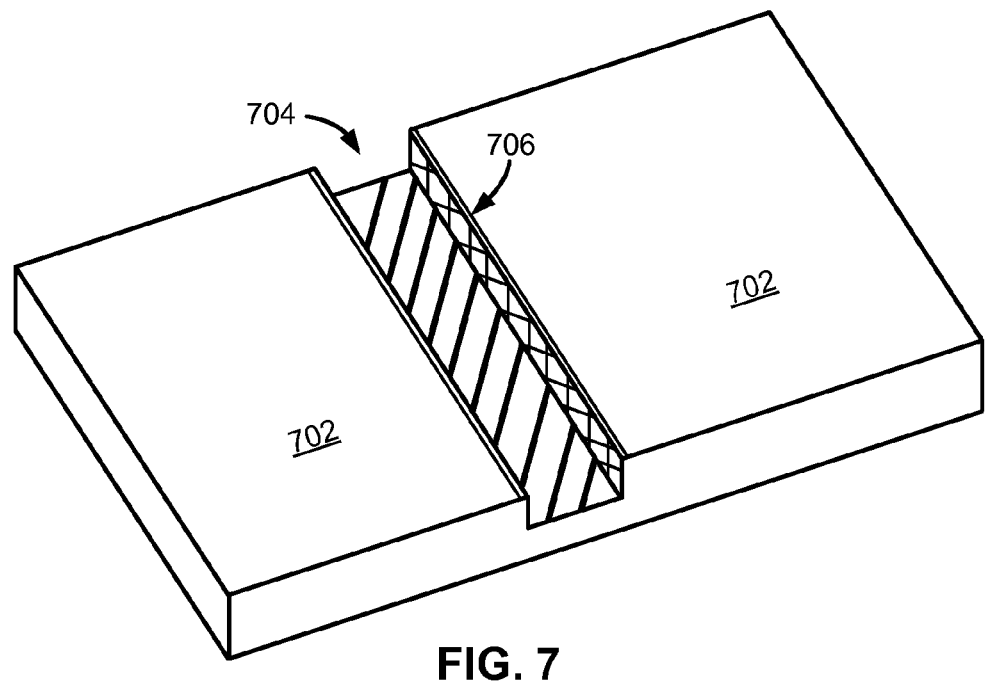
FIG. 7 shows a representation of a burred channel formed in a material (workpiece) by a milling machine.

FIG. 7 shows a representation of an actual channel 704 formed in a material 702 (workpiece) by a milling machine (such as the one shown in FIG. 2). A burr or burred edge 706 is formed along the edge of the channel 704.

Figure 8:
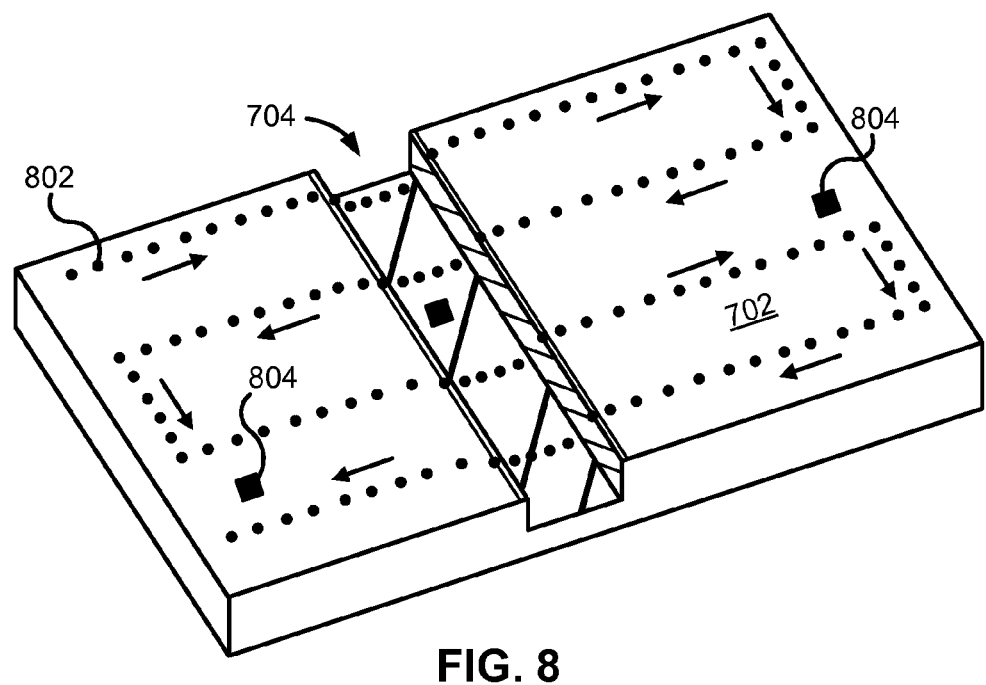
FIG. 8 shows an exemplary set of positions from which measurements are taken from the material (workpiece) shown in FIG. 7 according to one implementation of the invention.

FIG. 8 shows an exemplary set of positions from which measurements are taken from the material (workpiece) shown in FIG. 7 according to one implementation of the invention. With reference to FIG. 8, each of the positions 802 corresponds to a position along an x-axis, a y-axis and a z-axis of a CNC machine (not shown). The set of positions 802 (and corresponding distance measurements) follow a path taken by an operating arm and a laser distance measuring machine (not shown) as the distance measuring machine passes over the workpiece. For sake of illustration only, the path shown in FIG. 8 is shown as a search pattern path as indicated by the direction arrows. However, any style or type of path may be taken by the operating arm and distance measuring machine. Further, while a certain number of measurements 802 are shown, an actual number of measurements 802 may vary. The measurements 802 are shown taken at somewhat regular spatial intervals, however, such is not a limitation of the invention. In fact the measurements 802 are most likely taken at very regular timing intervals and due to the non-zero accelerations of the production equipment, the spatial intervals will vary relative to machine kinetics. A frequency of measurements may be varied according to one or more parameters including amount of variation in distance detected from measurement to measurement, or from area to area (e.g., flat surface 702 versus channel 704), etc. While a single path of measurements 802 is shown, multiple passes may be taken over the same path so as to build a set of distance measurement values for the same coordinate values such as those taken for the x-axis, the y-axis and the z-axis observed by the CNC machine. The result of capturing the set of distance and coordinate measurements is a "cloud" of distance values or—when coordinated with the location and position information from the CNC machine—a "point cloud" that accurately covers substantial regions of a workpiece.

In contrast to the density of measurement values 802 captured according to the invention, a second set of measurement values 804 are shown. The second measurement values 804 represent those values captured according to the previously known technique where a working arm would stop at a location, the CNC machine would trigger and capture a measurement reading 804 (coordinated to known positions along the x-, y- and z-axes) and then move to another location and repeat the procedure. In the time it would take to capture one or a few single measurements according to previously available techniques, thousands and tens of thousands of measurements may be captured according to the invention.

Figure 9:
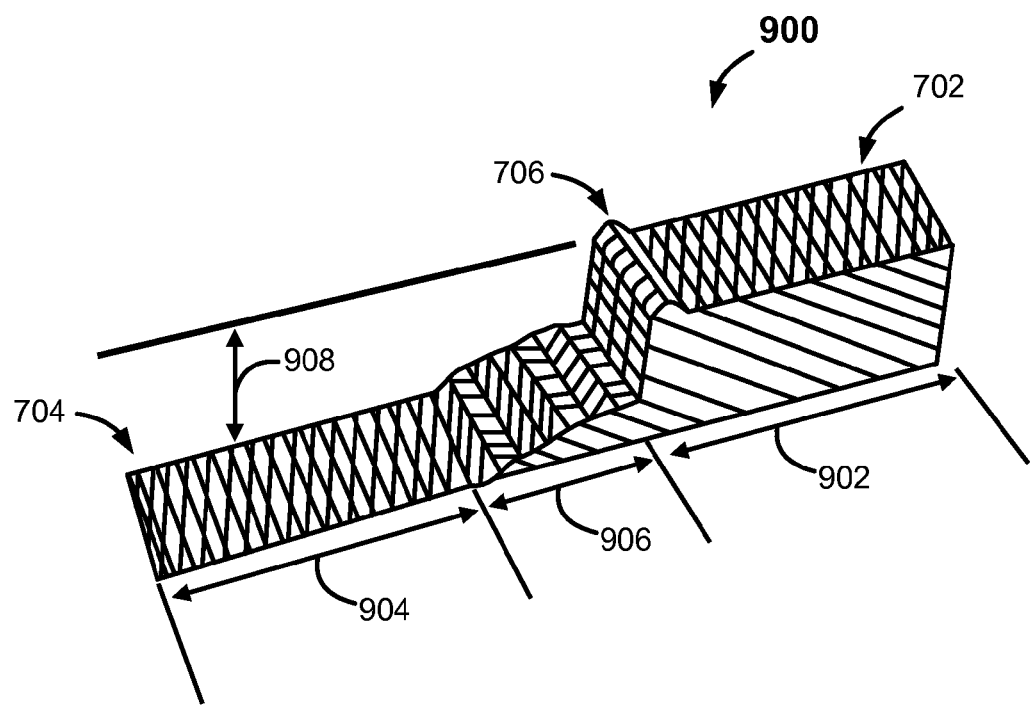
FIG. 9 shows a close-up view of a portion of the burred channel shown in FIG. 7 and FIG. 8.

FIG. 9 shows a close-up schematic view of a portion of the burred channel 704 and workpiece 900 shown in FIG. 7 and FIG. 8. With reference to FIG. 9, there are at least three regions 902, 904 and 906 that are evident—at least one that is not evident with the naked eye when viewing the workpiece shown in FIG. 7. The top surface 702 and top region 902 are separated from the channel 704 and the channel area 904 by a burred edge 706 and by a transition region 906. The burred edge 706 is evident in FIG. 7, the uneven transition region 906 is not. Workpiece production and touch probe inspection known in the current art generally does not allow for close inspection and characterization of fine details near and around transitions from one feature to another. However it is this very granular high fidelity information that can be used to predict local stresses, very critical fit-up characteristics, etc. Thus there is great potential industrial value associated with automated high fidelity of inspection that can characterize the transition zones between features and map these characterizations to the workpiece model. The invention enables such high fidelity inspection.

A casual inspection of the workpiece 900 would indicate that the channel 704 is properly located at a certain depth 908 below the top surface 702 of this workpiece 900. A depth micrometer could be used to characterize the depth of channel 704, and with great difficulty the flatness of the channel, and even more difficulty characterize the transition zone 906. Similarly a touch probe inspection, either in the production equipment or a CMM, could be used to characterize the depth of channel 704 but would be of limited utility for characterizing the transition zone 906 within a few thousandths of an inch of the boundary between zones 704 and 702. However, the invention facilitates a very detailed inspection of this interior corner, zone 906. Additionally the invention facilitates a characterization of the burred edge 706.

Figure 10:
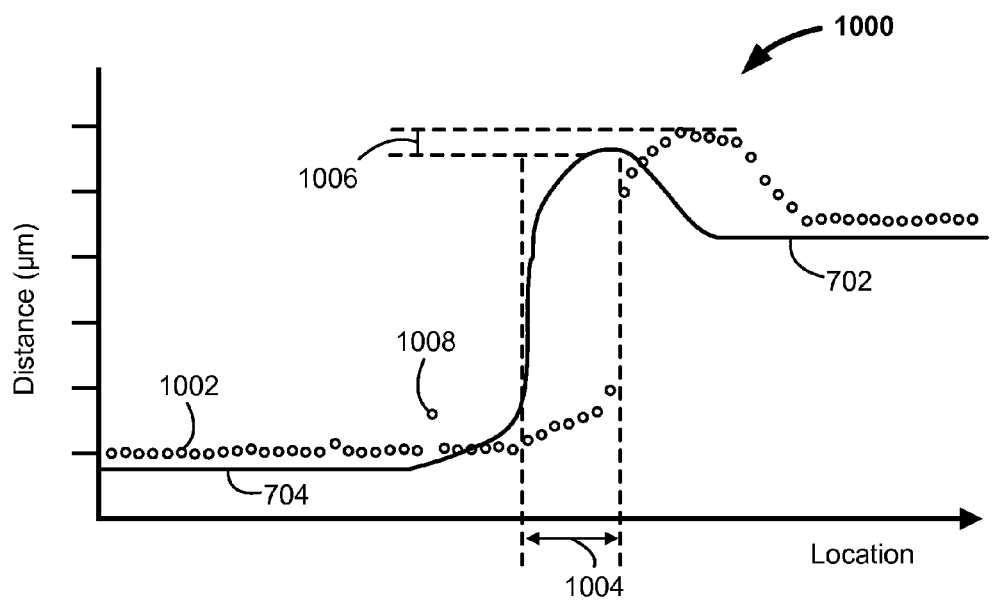
FIG. 10 shows a plot of a set of measurements relative to a cross-section of the burred channel shown in FIGS. 7-9 according to one implementation of the invention.

FIG. 10 shows a plot of a set of measurements 1000 relative to a cross-section of the burred channel shown in FIGS. 7-9 according to one implementation of the invention. With reference to FIG. 10, a set of measurements 1002 plot workpiece surface as a function of travel distance, as detected by a distance measuring metrology instrument. Also shown is an actual profile of the top surface 702 and bottom surface (channel) 704. As can be seen, the measurements 1002 accurately reflect the dimensions and shape of the top surface 702, burred channel 704, transition region and burred ridge (not labeled in FIG. 10). However, as observed in practice, the measurements 1002 may be shifted relative to the actual location of these features. The shift shown in FIG. 10 is observed when scanning from left to right; the shift is toward the direction of scan. Similarly, in practice the measurements 1002 are shifted to the left when scanning from the right to the left. When the right-to-left scan speed matches the left-to-right scan speed, balanced shifts are observed. By knowing the localized scan speed and precise time interval between data points, a precise spatial shift can be calculated.

For instance, when the scan speed is 3,048 mm/min and the data logging rate is 2,048 Hz, simple calculations will reveal the scan speed is 50.8 mm/sec, the time interval between logging events is 488.3 microseconds, and the spatial interval between logging events is 24.8 micro-meters. We utilized Polyworks to analyze raw data from two scans of the same feature, from two opposite directions and measuring the total spatial offset between the raw measured locations of sharply defined features. One such sharply defined feature is the pocket edge associated with FIG. 10, dimension 1004.

A total spatial offset measurement between recoded locations of a sharply defined feature in raw scan data in practice was measured to be 40 micrometers while scanning at 3,048 mm/min and logging at 2,048 Hz. Half of this offset is due to the temporal metrology instrument delay while scanning in one direction while the other half is due to the metrology instrument's temporal delay while scanning in the opposite direction. The spatial result of the metrology instrument's temporal delay while scanning at 3,048 mm/min is 40/2=20 micrometers. Dividing this spatial delay by the spatial logging interval yields a shift ratio of [(20 micrometer spatial lag)/(24.8 micro-meter spatial scan travel/logging event)=0.806]. Thus the metrology instrument's temporal delay can be accounted for by interpolating all machine coordinate data back in space the 81% of the vector established between two adjacent logging events while logging at 2,048 Hz.

We found that in practice a post-scan applied spatial shift algorithm using linear interpolation results in an exemplary data set, but other types of interpolation or extrapolation (where appropriate) are possible. For every logged event we consider the production machine's axis recordings (spatial) separate from the recorded metrology value. The spatial shift algorithm assigns each logged metrology reading to a point in space equivalent to the previous logging event's spatial location plus (1 minus the shift ratio, for our example 1−0.81=0.19) times the instantaneous scan vector. For example: three consecutive metrology readings (13.497, 13.499 and 13.502) where logged at three machine locations [(0.000, 1.000, −12.000), (0.025, 1.000, −12.000), (0.050, 1.000, −12.000)]. The first metrology reading would be discarded since there is inadequate data to determine the instantaneous scan approach vector. The second metrology reading has adequate data to determine the instantaneous scan vector. The first instantaneous scan vector is [(0.025, 1.000, −12.000)−(0.000, 1.000, −12.000)=(0.025, 0.000, 0.000)]. The appropriate shift location for the second metrology reading is calculated as [(1−0.81)*(0.025, 0.000, 0.000)+(0.000, 1.000, −12.000)=(0.005, 1.000, −12.000)]. Thus the metrology reading of 13.499 would be assigned to spatial location (0.005, 1.000, −12.000). The second instantaneous scan vector is calculated as [(0.050, 1.000, −12.000)−(0.025, 1.000, −12.000)=(0.025, 0.000, 0.000)]. The appropriate shift location for the third metrology reading is calculated as [(1−0.81)*(0.025, 0.000, 0.000)+(0.025, 1.000, −12.000)=(0.030, 1.000, −12.000)]. Thus the metrology reading of 13.502 would be assigned to spatial location (0.030, 1.000, −12.000).

Regardless of scan speed or direction when this shift algorithm is applied, the sharp features of a scanned artifact show in the same spatial location.

As observed in practice and explained above, the measurements 1002 may be spatially shifted (position) relative to CNC machine coordinates to obtain a post-processed data set that substantially agrees with other regardless of scan direction or speed. It can be concluded that a spatial shift 1006 is needed and is completely predictable so as to match the measurement values 1002 with position coordinate values of the CNC machine. A spatial shift may include a change or shift in time or position of one or more of the coordinate axis values (e.g., x-axis, y-axis and z-axis values) associated with the working arm or spindle. Such positional shift may be experimentally obtained when configuring or attaching a metrology instrument to the working arm or spindle and scanning bi-directionally over sharply defined discontinuities of the work piece.

Occasionally, an outlier measurement value 1008 may be observed. Such values may or may not be filterable or removable through a filter (e.g., low-pass filter) associated with a converter (or other device) described herein.

In one implementation, about 2,048 measurement values were captured per second, and three independent scans of the identically programmed path were captured in rapid succession. The travel rates of the measurement device were about 1,524 millimeters per minute, 3,048 millimeters per minute, and 6,096 millimeters per minute. Each scan path included a left-to-right and right-to-left motion over the same programmed path. When the composite raw data was reviewed the edge details showed the effects of a fixed temporal delay and various scan speeds. When the composite data was post processed in accordance with the spatial shift algorithm outlined above, an exemplary composite data set was established similar to that depicted in FIG. 11. In the shifted composite data, all sharp features showed at the same location and remarkably several of the outlier measurements 1008 also showed at significantly the same location. Upon further inspection of the workpiece under a high magnification microscope the edge transition region 906, the bur 706 and the existence of tiny particulate matter laying on the surfaces 702 and 704 were confirmed. Thus the spatial shift algorithm, and means of determining the appropriate total spatial shift (accounting for instantaneous scan speed and direction; and accounting for total system temporal delay: measurement instrument temporal delay, encoder processing temporal delay, encoder to recording device transmission delay, and all other delays between crossing over a sharp work piece discontinuity and recording such discontinuity) is exemplary.

Figure 11:
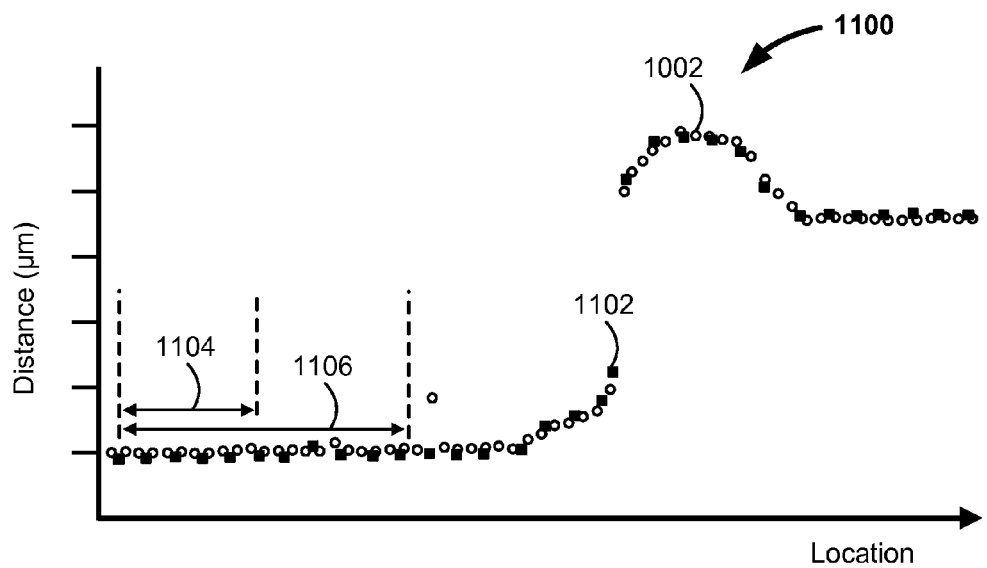
FIG. 11 shows a plot of two sets of measurements of a portion of the burred channel shown in FIG. 7.

FIG. 11 shows a plot of two sets of measurements of a portion of the burred channel shown in FIG. 7. A first set of measurements 1002 is first shown in FIG. 10. With reference to FIG. 11, a first set of distance measurements 1002 and a second set of distance measurements 1102 are plotted as a function of travel distance, or location. As observed in practice, the two sets of measurements 1002, 1102 substantially match each other. The two sets of measurements 1002, 1102 are derived from the CNC machine's passing a measurement device over a same path of a workpiece such as over the burred channel 704 of FIGS. 7-9. The spatial frequency of measurement capture for the first set of measurements 1002 is higher than the spatial frequency of measurement capture for the second set of measurements 1102 (scan speed associated with 1002 was lower than the scan speed for the second set 1102 while the temporal logging rate remained constant). Accordingly, for a set of 10 measurements from the first set of measurements 1002, it takes a first scan path distance 1104, and a longer scan path distance 1106 for a corresponding set of 10 measurements from the second set of measurements 1102. As can be seen in FIG. 11, and as observed in practice, the measurements are repeatable and consistent even when taken at different rates or scan speeds. Thus, the scan path speed and or the temporal logging interval of capturing measurements may be varied without detracting from the utility of the invention as long as the system temporal delay is determined and compensated for in a manner significantly similar to the spatial shift algorithm described above.

In summary, a laser scanner provides a means for a non-contact method to measure distance to a surface of a workpiece. Fast, continuous measurements or samples are captured. The measurement machine is mounted to a working arm or spindle of a CNC machine. Three-dimensional point cloud images of a workpiece are the result. The process is completely automated or semi-automated. Resolution of the distance values is optical, not mechanical. Non-contact detection eliminates damage either to the target or sensor head, ensuring a long service life and maintenance-free operation of measurements. Measurements may be taken of a variety of materials, finishes, or angles of incidence. Detection may be based on the quantity of light received by the measurement device, or a change in the quantity of reflected light. Thus, detection is possible for workpieces made of glass, metals, plastics, woods, and liquids.

The distance between workpiece and measurement device may be substantial such that a measurement device may be used according to the invention in a variety of settings and in a variety of machines. For a reflective-type photoelectric sensor, a measurement distance may range from a few millimeters or less up to about 2.0 m (6.6 ft). A thrubeam-type measurement device has a detecting distance of up to about 40.0 m (131.2 ft). A retro-reflective type measurement device has a detecting distance of up to about 50 m (164 ft).

Currently available photoelectric sensors are capable of a response rate as high as about 400 kHz. With current sensors, color differentiation is possible. A sensor has the ability to detect light from an object or workpiece based on the reflectivity of its color, thus permitting color detection and color differentiation.

Figure 12:
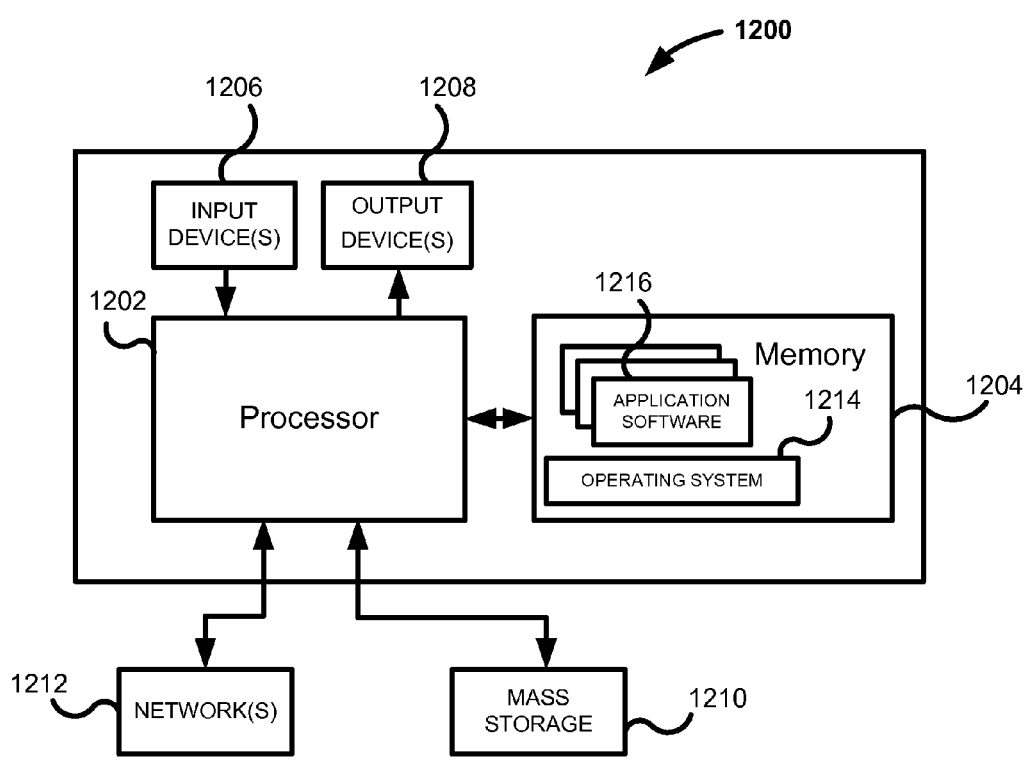
FIG. 12 shows an exemplary hardware device that may be used to implement one or more of the components or devices described herein.

FIG. 12 of the drawings shows an exemplary hardware 1200 that may be used to implement the present invention. Referring to FIG. 12, the hardware 1200 typically includes at least one processor 1202 coupled to a memory 1204. The processor 1202 may represent one or more processors (e.g. microprocessors), and the memory 1204 may represent random access memory (RAM) devices comprising a main storage of the hardware 1200, as well as any supplemental levels of memory, e.g., cache memories, non-volatile or back-up memories (e.g. programmable or flash memories), read-only memories, etc. In addition, the memory 1204 may be considered to include memory storage physically located elsewhere in the hardware 1200, e.g. any cache memory in the processor 1202 as well as any storage capacity used as a virtual memory, e.g., as stored on a mass storage device 1210.

The hardware 1200 also typically receives a number of inputs and outputs for communicating information externally. For interface with a user or operator, the hardware 1200 may include one or more user input devices 1206 (e.g., a keyboard, a mouse, imaging device, scanner, etc.) and a one or more output devices 1208 (e.g., a Liquid Crystal Display (LCD) panel, an electronic whiteboard, a touch screen, a sound playback device (speaker)).

For additional storage, the hardware 1200 may also include one or more mass storage devices 1210, e.g., a floppy or other removable disk drive, a hard disk drive, a Direct Access Storage Device (DASD), an optical drive (e.g. a Compact Disk (CD) drive, a Digital Versatile Disk (DVD) drive, universal serial bus (USB) drive, etc.) and/or a tape drive, among others. Furthermore, the hardware 1200 may include an interface with one or more networks 1212 (e.g., a local area network (LAN), a wide area network (WAN), a wireless network, and/or the Internet among others) to permit the communication of information with other computers coupled to the networks. It should be appreciated that the hardware 1200 typically includes suitable analog and/or digital interfaces between the processor 1202 and each of the components 1204, 1206, 1208, and 1212 as is well known in the art.

The hardware 1200 operates under the control of an operating system 1214, and executes various computer software applications, components, programs, objects, modules, etc. to implement the techniques described above. Moreover, various applications, components, programs, objects, etc., collectively indicated by reference 1216 in FIG. 12, may also execute on one or more processors in another computer coupled to the hardware 1200 via a network 1212, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

Alternatives.

While the above description has been for a CNC machine, the techniques are applicable to any type of machine when combined with a measuring device. While a measurement device has been illustrated or exemplified with a laser displacement or distance measuring device other types of measuring devices may be combined with a machine. For example, a detector or electronic measurement device 202 may be any commercial, off-the-shelf (COTS) photoelectric sensor that uses a red laser diode or infrared laser diode as its signal. As another example, a measurement device 202 may measure eddy currents and may thus provide data for visualization of certain qualities of a material or may determine distance such a laser-based measuring device would. Eddy currents are electric currents induced within a conductive material. Eddy currents have inductance and induce magnetic fields, which in turn can cause repulsive, propulsive, drag and heating effects. Eddy currents and related measurements are typically measured as a scalar and may be measured over a circular area down to 50 micrometers (0.002 in.) diameter. In another example, a measuring device is an ultrasound sensor. Distances and other characteristics may be detected through the use of an ultrasound device. Other data from such measurement devices may be synchronized or coordinated with position-based measurements or each other in the same or similar ways as described herein.

The above description also makes reference to an encoder. The encoder could be any type of computer device, computing component, circuitry, hardware, firmware, software and the like, and combinations of the same. The invention may alternatively be implemented in field programmable gate arrays (FPGA) and the like. The invention embraces these and all implementations of the techniques described herein.

Systems as described herein are capable of logging or recording only one point for every few points (e.g., 10, 25) that a laser displacement sensor measures and delivers. One example of a logging rate is 2,048 Hz, while an exemplary measurement rate is 50,000 Hz. Other rates are possible. It is possible to log every single laser displacement sensor measurement and accurately locate it on a workpiece. The same routine involving a fabricated index signal that is currently disclosed for ultra-sound and eddy current can be used to log every laser displacement sensor measurement.

For ease of locating each measurement, in one implementation, it is assumed that the fabricated index signal increments at 204,800 Hz in a saw tooth pattern. The encoder creates the index signal, and sends it to the CNC machine. When a new measurement is received by the encoder from the laser displacement sensor, the encoder logs both the laser displacement sensor measurement and its current value of the index signal. The CNC logs the value of the index signal and its axis at the 2,048 Hz rate. For every CNC machine logging event, the index signal has incremented one hundred units. This large index increment allows the system to locate every laser displacement sensor measurement to within $\frac{1}{100}$th of the distance moved between CNC events. It is possible to locate every laser displacement sensor measurement within about 0.5 microns when scanning at 6 meters per minute, 240 ipm.

Along with values associated with a motorized indexing head (such as model PH-10MQ commercially available from Renishaw (Hoffman Estates, Ill., USA)), it is possible to log line scan data in the same way. This is done by capturing every point on every measurement cycle in the encoder along with an index value. The CNC machine can track and log the index signal as discussed. The motorized indexing head provides sufficiently accurate orientation to locate every point along the fan of a line scanner. Again, all data from the line scanner can be logged by the encoder along with an index signal, giving a reference to accurately locate every measurement point from a line scanner.

Conclusion.

In the previous description, for purposes of explanation, numerous specific details are set forth in order to provide an understanding of the invention. It will be apparent, however, to one skilled in the art that the invention can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. It will be evident that the various modification and changes can be made to these embodiments without departing from the broader spirit of the invention. In an area of technology such as this, where growth is fast and further advancements are not easily foreseen, the disclosed embodiments may be readily modifiable in arrangement and detail as facilitated by enabling technological advancements without departing from the principles of the present disclosure.

We claim:

1. A system, comprising:
a metrology device configured to measure workpiece metrology values;
a manufacturing machine comprising an operating tool arm fixed to the metrology device and a workpiece at least partially inside the working envelope of the manufacturing machine, configured to measure and record its position coordinate values and an index signal value at a regular or near regular first frequency;
a computer component configured to generate an index signal that increments periodically at a regular or near regular second frequency;
a computer component configured to simultaneously record the workpiece metrology values and the corresponding index signal values creating a matrix of metrology values and raw index values;
a computer component configured to temporally adjust the index values and create a matrix of workpiece metrology values and temporally adjusted index values;
a computer component configured to transmit the index signal to the manufacturing machine in a format compatible with the manufacturing machine;
a computer component configured to interpolate the manufacturing machine position coordinate values corresponding with the matrix of temporally adjusted index values;
a computer component configured to apply a vector addition of interpolated machine position coordinate values and corresponding workpiece metrology values creating a spatially oriented workpiece metrology value matrix; and
a computer component configured to visualize, summarize, and/or report the resulting spatially oriented workpiece metrology value matrix.

2. The system of claim 1, wherein at least one of the metrology device or a computing component is configured to filter the workpiece metrology values according to a filtering criterion.

3. The system of claim 1, wherein the temporal adjustment is constant.

4. The system of claim 1, wherein the at least one of the metrology device or a computing device is configured to vary a rate of measurement and/or recording of the metrology values during the cycle of movement based on a measured characteristic of the workpiece.

5. The system of claim 1, wherein the metrology device comprises one of a surface flaw detector, a through-body inspection device, an x-ray fluorescence (XRF) analyzer, a non-contact distance measurement device, or a contact distance measurement device.

6. The system of claim 1, wherein the manufacturing machine comprises one of a computer numerically controlled (CNC) machine or a robot.

7. A method for determining a property of a workpiece in a coordinate machine, comprising:
measuring, by a measuring device attached to a machine tool arm of the coordinate machine, a property value associated with a spatial point of a workpiece as the machine tool arm performs a movement sequence along a programmed path;
encoding the property value to yield an encoded value comprising a format acceptable by a recording component of the coordinate machine;
matching the encoded value to a coordinate value for the machine tool arm during the movement sequence; and
recording the encoded value in association with the coordinate value.

8. The method of claim 7, wherein the matching comprises at least one of applying a temporal delay value to the coordinate value and comprises measuring an impedance value as the property value.

9. The method of claim 8, further comprising:
matching a plurality of encoded values, including the encoded value, to a plurality of coordinate values to yield synchronized data;
determining a map of impedance values for the workpiece based on the synchronized data; and
generating a graphical representation of the workpiece based on the map of impedance values.

10. The method of claim 9, wherein the generating the graphical representation comprises illustrating at least one of a high impedance line or a zone of the workpiece indicative of a surface flaw, a near surface flaw, or a discontinuity.

11. The method of claim 7, further comprising:
matching a plurality of encoded values, including the encoded value, to a plurality of coordinate values to yield synchronized data; and
generating a graphical representation of the workpiece based on the synchronized data.

12. A method for determine a workpiece property, comprising:
measuring, with a measuring device attached to a machine tool arm of a coordinate machine, a value associated with a point of the workpiece as the machine tool arm traverses a programmed path;
generating a modulated indexing signal that increments at a defined frequency;
matching the value associated with the point of the workpiece with a first value of the modulated indexing signal correspond to a time of the measuring;
interpolating a coordinate value for the machine tool arm corresponding with the first value of the modulated indexing signal corresponding to a time of the measuring; and
recording the interpolated coordinate value for the machine tool arm with the corresponding workpiece property value.

13. The method of claim 12, further comprising:
measuring a set of distance values, including the distance value, using an ultrasound measuring device; and
matching the set of distance values with a corresponding set of coordinate values recorded for the machine tool arm during traversal of the machine tool arm along the programmed path, wherein the matching is based on the modulated indexing signal.

14. The method of claim 13, further comprising:
determining a set of dimensional coordinates for the workpiece based on the set of distance values and the set of coordinate values; and
generating a graphical representation of the workpiece based on the set of dimensional coordinates, wherein the graphical representation illustrates at least one of an internal reflecting body of the workpiece or a surface characteristic of the workpiece.

15. The method of claim 12, wherein the measuring comprises measuring a value associated with an alloy make-up table using an X-ray device.

16. The method of claim 15, further comprising:
determining a set of alloy compliant zones and non-compliant zones for the workpiece based on the value associated with the alloy make-up table, the encoded index value, the coordinate value, and a zoned alloy make-up specification; and
generating a graphical representation of the workpiece based on the set of alloy compliant zones and non-compliant zones.

17. The method of claim 12, further comprising applying a time offset to at least one of the encoded index value, the coordinate value, or the value associated with the point of the workpiece to yield synchronized data.

18. A method for spatial correction of metrology data, comprising:
recording metrology data values substantially synchronously with spatial coordinate values for a production device as the production device traverses a programmed path;
computing an instantaneous scan vector based at least in part on the spatial coordinate values; and
assigning a metrology data value, of the metrology data values, to a spatial location based on the instantaneous scan vector.

19. The method of claim 18, wherein the metrology data value is recorded substantially synchronously with a first of the spatial coordinate values, and wherein the assigning comprises assigning the metrology data value to a spatial location corresponding to a second of the spatial coordinate values immediately prior to the first of the spatial coordinate values plus a fraction of the instantaneous scan vector.

20. The method of claim 19, wherein the fraction comprises one minus a shift ratio determined for a metrology instrument that measures the metrology data values, wherein the shift ratio comprises a temporal delay of the metrology instrument divided by a temporal logging interval of the production device.

* * * * *